UNITED STATES PATENT OFFICE.

JOHN E. PARK, OF LA VERGNE, TENNESSEE.

IMPROVEMENT IN THE MANUFACTURE OF CEMENT.

Specification forming part of Letters Patent No. 138,924, dated May 13, 1873; application filed April 6, 1871.

*To all whom it may concern:*

Be it known that I, JOHN E. PARK, of La Vergne, Rutherford county, Tennessee, have invented a new and Improved Cement, and process of burning it, of which the following is a specification:

My invention relates to a new hydraulic cement, and to a process of burning the same to develop its highest cementitious qualities. The cement is composed of any of the forms of lime, with thirty to forty per cent. of clay, (alumina and silica,) five to ten of fine sand, (silex,) and five per cent. of soda (carbonate, muriate, or caustic) or potash. These materials are mixed together and moderately worked into union so that they will not be in very intimate contact; the less the amount of clay the more intimate should be the mixture, and the larger the amount of clay the less intimate. The mass thus formed is first dried, then broken up and burned in a kiln provided with inspection or watch holes, and furnaces or fire-places, one above another, or at various heights from its base, to enable the burner to know the exact condition of, and have perfect control over, the burning at all times. The material is stratified with wood, or other combustible material, and the mass brought to a full red heat. If now a specimen be withdrawn from one of the watch-holes and broken open, it will show a pale-blue color, which indicates insufficient calcination. The heat must be continued until the specimens thus withdrawn present a bright sulphur color, both externally and internally, and the surface of the mass in the kiln shows incipient fusion or vitrification. These are the marks of a perfect calcination such as will alone produce a cement of the best or most highly cementitious character, but incipient surface fusion is the main reliance, since the materials of the cement will sometimes have different proportions of metallic oxides in their composition and the color vary a little under the influence of heat. No good cement can be produced by any degree of heat as indicated by a thermometer or pyrometer, as different compounds are more or less vitrescent; the above marks are the guides. As long-continued heat at a lower temperature is prejudicial to the quality of the cement the burn should be finished in from eight to fifteen hours.

The proportions of the ingredients of the cement may vary somewhat, but I prefer those above given as being the result of numerous experiments and practical tests. The lime or cement thus produced will slack with water and will not set in water, but will set immediately in the air; the hardening process will then go on in water.

It may be remarked that the substantially same tests of calcination apply to the burning of a water-setting cement composed of lime with clay, fifteen to twenty-five per cent.; fine sand, three to five per cent.; and soda or potash, three to five per cent.

Having thus described my invention, what I claim as new, and desire to secure by Letters Patent, is—

1. The hydraulic lime or cement composed of the ingredients in the proportions specified.

2. The process of preparing and calcining the cement, as set forth.

JOHN E. PARK.

Witnesses:
ROBERT McCAY,
E. F. WILSON.